United States Patent
Yang et al.

(10) Patent No.: US 11,144,194 B2
(45) Date of Patent: Oct. 12, 2021

(54) INTERACTIVE STEREOSCOPIC DISPLAY AND INTERACTIVE SENSING METHOD FOR THE SAME

(71) Applicant: Lixel Inc., Taipei (TW)

(72) Inventors: Chun-Hsiang Yang, Hsinchu (TW);
Kai-Chieh Chang, Kaohsiung (TW);
Chih-Hung Ting, New Taipei (TW)

(73) Assignee: Lixel Inc., Taipei (TW)

( * ) Notice: Subject to any disclaimer, the term of this patent is extended or adjusted under 35 U.S.C. 154(b) by 0 days.

(21) Appl. No.: 16/575,393

(22) Filed: Sep. 19, 2019

(65) Prior Publication Data

US 2021/0089199 A1      Mar. 25, 2021

(51) Int. Cl.
*G06F 3/01* (2006.01)
*G06F 3/0488* (2013.01)
*H04N 13/275* (2018.01)
*G06T 15/10* (2011.01)
*G09G 3/00* (2006.01)

(52) U.S. Cl.
CPC .......... *G06F 3/04883* (2013.01); *G06T 15/10* (2013.01); *G09G 3/003* (2013.01); *H04N 13/275* (2018.05); *G06F 2203/04806* (2013.01); *G06T 2207/10021* (2013.01)

(58) Field of Classification Search
CPC ....... G06F 3/04883; G06F 2203/04806; G06F 3/011; G06F 3/04845; G06F 3/04815; G06F 3/017; G06F 2203/04101; H04N 13/275; H04N 13/194; G06T 15/10; G09G 3/003; G09G 2354/00
See application file for complete search history.

(56) References Cited

U.S. PATENT DOCUMENTS

| | | | |
|---|---|---|---|
| 6,061,083 A * | 5/2000 | Aritake | H04N 13/128 348/51 |
| 9,338,432 B1 * | 5/2016 | Roy | G06F 3/017 |
| 9,569,010 B2 * | 2/2017 | Campillo | G06F 3/0304 |
| 10,019,919 B2 * | 7/2018 | Hashimoto | G06F 3/0421 |

(Continued)

FOREIGN PATENT DOCUMENTS

| | | |
|---|---|---|
| TW | 201427388 A | 7/2014 |
| TW | 201918065 A | 5/2019 |

*Primary Examiner* — Phong X Nguyen
(74) *Attorney, Agent, or Firm* — Li & Cai Intellectual Property Office

(57) ABSTRACT

An interactive stereoscopic display and an interactive sensing method for the same are provided. In the method, a gesture sensor senses a hand gesture over a stereoscopic image displayed on a stereoscopic display. The gesture is such as moving, rotating or zooming actions. The gesture is referred to, to obtain stereo coordinate variations that are used to determine an interactive instruction. Next, the stereoscopic display or a stereoscopic image server generates a new stereoscopic image data by comparing image coordinate data of the stereoscopic image with a previous state of image coordinate data according to the interactive instruction. The stereoscopic image data describes color and three-dimensional information of the stereoscopic image. Therefore, the stereoscopic display displays a new stereoscopic image using the new stereoscopic image data. The method achieves an interactive effect with the stereoscopic image using the gesture.

14 Claims, 6 Drawing Sheets

(56) References Cited

U.S. PATENT DOCUMENTS

| | | | |
|---|---|---|---|
| 2009/0046140 A1* | 2/2009 | Lashmet | G09G 3/002 348/51 |
| 2012/0062558 A1* | 3/2012 | Lee | G06F 3/04812 345/419 |
| 2012/0223909 A1* | 9/2012 | Tse | G06F 3/0304 345/174 |
| 2012/0242793 A1* | 9/2012 | Im | G06F 3/016 348/46 |
| 2012/0262446 A1* | 10/2012 | Im | H04N 13/122 345/419 |
| 2014/0317576 A1* | 10/2014 | Song | G06F 3/04842 715/852 |
| 2016/0202873 A1* | 7/2016 | Chi | G06F 3/005 345/173 |
| 2017/0192493 A1* | 7/2017 | Ofek | G06F 3/04883 |
| 2018/0074580 A1* | 3/2018 | Hardee | G08B 5/36 |
| 2018/0129200 A1* | 5/2018 | Tian | G06F 3/0304 |
| 2018/0307397 A1* | 10/2018 | Hastings | G06F 3/0485 |
| 2019/0004609 A1* | 1/2019 | Swissa | G06T 7/70 |
| 2019/0034029 A1 | 1/2019 | Huang et al. | |
| 2020/0265594 A1* | 8/2020 | Aguirre-Valencia | G06F 3/012 |

* cited by examiner

INTERACTIVE STEREOSCOPIC DISPLAY AND INTERACTIVE SENSING METHOD FOR THE SAME

FIELD OF THE DISCLOSURE

The disclosure is generally related to a stereoscopic display, and more particularly to an interactive stereoscopic display that allows a user to interact with a stereoscopic image displayed on the interactive stereoscopic display and an interactive sensing method therefor.

BACKGROUND OF THE DISCLOSURE

Most conventional stereoscopic displays use the principle of parallax occurring in two eyes of a human to combine images with a displacement in the human's brain, so that a stereoscopic image with a depth is produced. The two images with a displacement are configured to be displayed on the stereoscopic display, and a user can wear a special device to enable viewing of the stereoscopic image when the two images are combined in the brain. The special device is such as red-cyan glasses, polarized glasses, shutter glasses or even a head-mounted display that allows the two images displayed on the display to be projected onto the two eyes of a human.

Further, a naked-eye stereoscopic display technology allows the images to be projected onto the two eyes of a human via a specific optical element disposed on the display. The optical element can be a lens or a raster that allows the human to perceive the stereoscopic image without need for special optical equipment.

Various conventional stereoscopic display technologies are generally only technologies for displaying, but not technologies allowing the user to interact with the stereoscopic image. One of the reasons that there is no interactive technology for the conventional stereoscopic display is that the conventional stereoscopic display technologies produce images combined as a virtual image in the human brain, such that it is not possible for the human to interact with the virtual image.

SUMMARY OF THE DISCLOSURE

The disclosure is related to an interactive stereoscopic display and an interactive sensing method thereof. The interactive stereoscopic display allows a user to interact with a stereoscopic image displayed on the stereoscopic image display by gesture. The user performs a gesture that can include moving, rotating or zooming actions. The gesture is referred to so as to obtain stereo coordinate variations through transformation, and an interactive instruction is therefore determined. A new stereoscopic image is accordingly produced. The method achieves an interactive effect with the stereoscopic image by gesture.

According to one embodiment of the disclosure, in the interactive sensing method for an interactive stereoscopic display, the stereoscopic image display displays a stereoscopic image according to a stereoscopic image data. A gesture sensor senses a gesture performed by a user. Variations of coordinates in response to the gesture can be obtained. The variations are referred to so as to determine an interactive instruction that can be used to obtain image coordinate data with respect to the present state of stereoscopic image. For example, image coordinate data of a new stereoscopic image that is calculated according to the interactive instruction can be obtained. After querying an image database, a new stereoscopic image data used to display the new stereoscopic image is obtained.

Further, a stereoscopic image server is provided in a whole system and is used to provide stereoscopic image data according to the interactive instruction. The stereoscopic image data is provided for the stereoscopic image display to display a stereoscopic image.

According to an embodiment of the gesture sensor, the gesture sensor determines a gesture by means of image detection, light interception, or acoustic wave reflection. The gesture indicates the variations of the three-dimensional coordinates with respect to the fingers, palm and knuckles of a user. The variations can be one or any combination of moving, rotating and zooming actions performed by the user.

In one embodiment of the interactive stereoscopic display, the display displays a stereoscopic image according to a stereoscopic image data. A gesture sensor is provided in the display and used to sense a gesture. Variations of three-dimensional coordinates with respect to the gesture can be obtained. Thus, in the interactive sensing method performed in the display, the gesture sensor senses the gesture, and obtains variations of coordinates with respect to the gesture. An interactive instruction is therefore determined. After comparing the image coordinate data of the stereoscopic image with a previous state of image coordinate data, a new stereoscopic image data can be obtained. A new stereoscopic image is displayed accordingly.

In one further embodiment of the disclosure, the interactive stereoscopic display is further linked with a stereoscopic image server. The stereoscopic image data can be provided from the stereoscopic image server. The stereoscopic image server receives the interactive instruction, and provides the new stereoscopic image data by querying an image database according to the interactive instruction.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
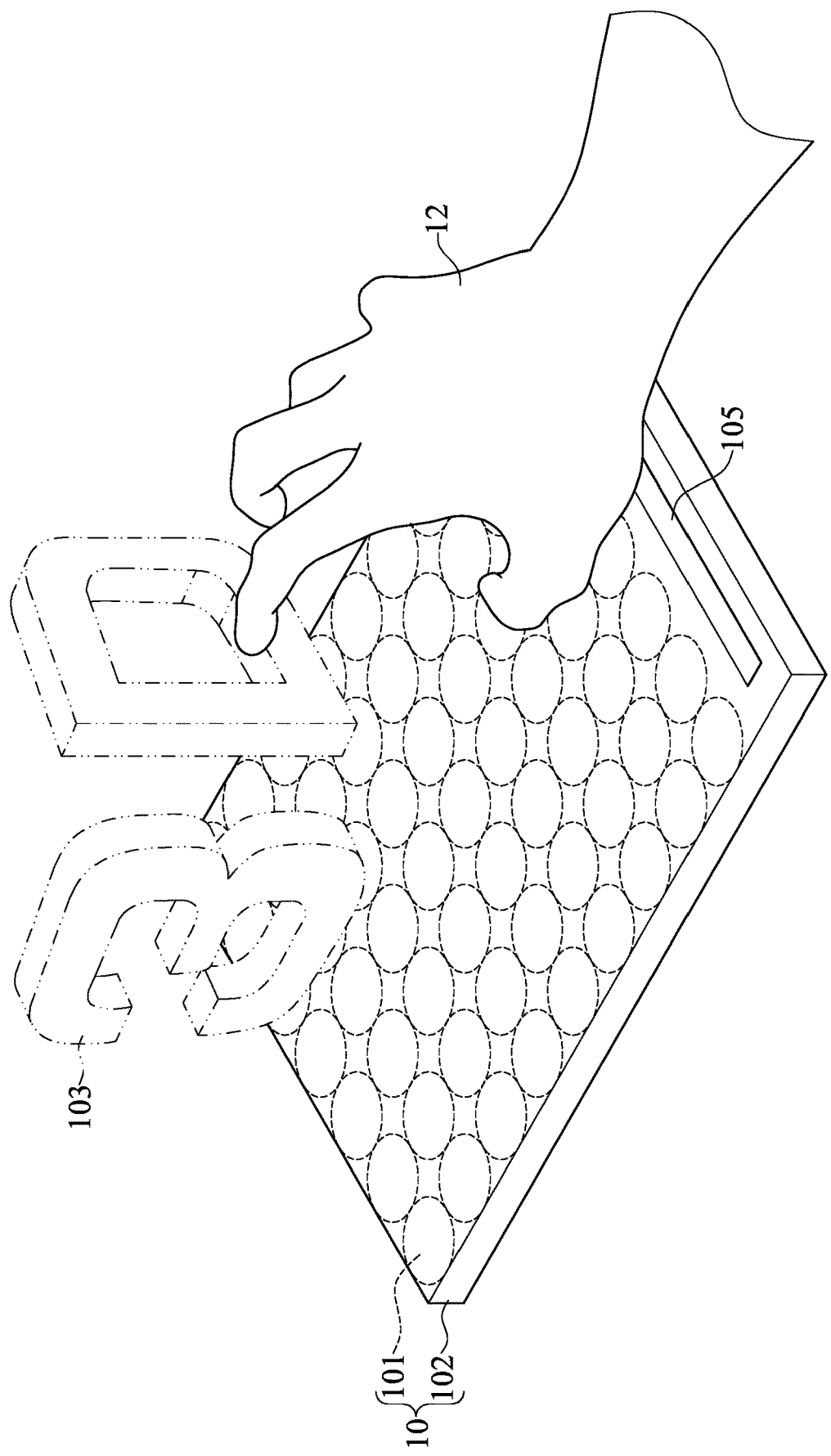
FIG. 1 is a schematic diagram depicting an interactive stereoscopic display according to one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to an interactive stereoscopic display and an interactive sensing method that is performed in the display. The interactive stereoscopic display allows a user to manipulate a stereoscopic image by gesture when viewing the stereoscopic image. In an exemplary example, a gesture sensor is used to sense the gesture that is performed over the stereoscopic image. The gesture is such as a moving, rotating or zooming action performed by the user. Stereo coordinate variations corresponding to the gesture can be obtained and are used to determine an interactive instruction. The interactive stereoscopic display can display the stereoscopic image in response to the gesture. Therefore, the user can interact with the stereoscopic image by gesture. It should be noted that the stereoscopic image can be a static three-dimensional object or a moving object that is formed by a series of stereoscopic images in motion.

In one of the applications of the display, the stereoscopic image display is able to display a floating stereoscopic image. The relevant technology utilizes a flat display panel to display multiple unit images simultaneously and the unit images render a full image, i.e. an integrated image. During the process of displaying the floating image, the integrated image displayed on the flat display panel can be projected to a space at a distance from the panel through an optical element, e.g. a lens array. Every unit image displayed on the flat display panel can be imaged through a corresponding lens. Further, multiple unit images can render the integrated image through multiple lenses. Thus, an effect for displaying a floating image can be achieved.

Reference is made to FIG. 1 that depicts a schematic diagram of the interactive stereoscopic display according to one embodiment of the disclosure.

A stereoscopic image display 10 in accordance with one of the embodiments of the disclosure is depicted. The stereoscopic image display 10 is essentially composed of an optical element 101 and a display panel 102. An image processor is included for processing the display content. The stereoscopic image display 10 communicates with an external image source in order to acquire a stereoscopic image data. The stereoscopic image data is processed for rendering the stereoscopic image 103.

Further, the stereoscopic image display 10 includes a gesture sensor 105 that is used to sense the gesture performed upon the stereoscopic image 103 by a hand 12 of the user. The gesture sensor 105 can be implemented by an image detection method, in which a camera is used to capture a series of images of one or more key portions of the hand 12. The key portions are such as a finger, a palm, and/or knuckles. Through an image processing method, changes of the images of the hand 12 within a period of time can be obtained. Each of the key portions of the hand 12 can be depicted by three-dimensional coordinates $X_{sensor}$, $Y_{sensor}$ and $Z_{sensor}$ in the Cartesian coordinate system or $\gamma$, $\theta$ and $\varphi$ in the spherical coordinate system with respect to the gesture sensor. After continuously acquiring the coordinates of gesture, a stereo coordinate variation can be obtained. The coordinates of the sensor-based coordinate system can be transformed to a display-based coordinate system with respect to the stereoscopic image display 10. Variations in three-dimensional coordinates ($X_{device}$, $Y_{device}$, $Z_{device}$) can be expressed by vectors (i.e. displacement and direction) and rates (i.e. distance and time). The variations are provided for the system to determine an interaction instruction including one or any combination of moving, rotating or zooming actions.

In one further embodiment, the gesture sensor 105 senses a gesture by the principle of light blocking. The gesture sensor 105 uses a light source to emit a sensing light and also a photo sensor to sense light spots on a hand 12 when the hand 12 blocks the light in a range of the sensing light. Therefore, an amount of light spots reflected by each of the key portions and time differences occurred among the light spots can be obtained. It should be noted that the light spots reflected by the key portions reflect changes of the key portions, and the time differences indicate the information relating to depths of the key portions. Similarly, the light information being obtained continuously can be used to obtain stereo coordinate variations formed by the gesture. The gesture allows the system to identify an interactive instruction indicative of one or any combination of the actions such as moving, rotating and zooming.

In one further embodiment, the gesture sensor 105 can be implemented by a sound generator and a sound receiver that uses acoustic waves reflected by the hand 12 to determine the gesture. When the hand 12 is within a sensing range of the acoustic waves of the gesture sensor 105, the hand 12 blocks the acoustic waves, and the reflected waves are formed. When the sound receiver receives the reflected waves, the changes of the reflected waves allow the sound receiver to detect variations of the key portions of the hand 12 in a space. The variations of the key portions can be interpreted as the stereo coordinate variations that can be used to determine the interactive instruction indicative of one or any combination of the actions such as moving, rotating and zooming.

The gesture sensor 105 can be implemented by a variety of technologies in the interactive sensing method for sensing the gesture performed by the user. The gesture indicates the positions of the fingers, the palm and/or the knuckles of the hand 12, and especially the variations of three-dimensional coordinates of the knuckles so as to determine the interactive instruction indicative of one or any combination of actions such as moving, rotation and zooming. After that, by querying the stereoscopic image data in an image database, a new corresponding stereoscopic image data can be used to display a next stereoscopic image data. The stereoscopic image data may include a static stereoscopic image or a video formed by a series of stereoscopic images. It should be noted that an interactive effect that instantly reacts to the user's gesture can be achieved by using processes including sensing the variations, transforming the coordinates, and calculating the stereoscopic image when performed with high-speed computation.

Figure 2:
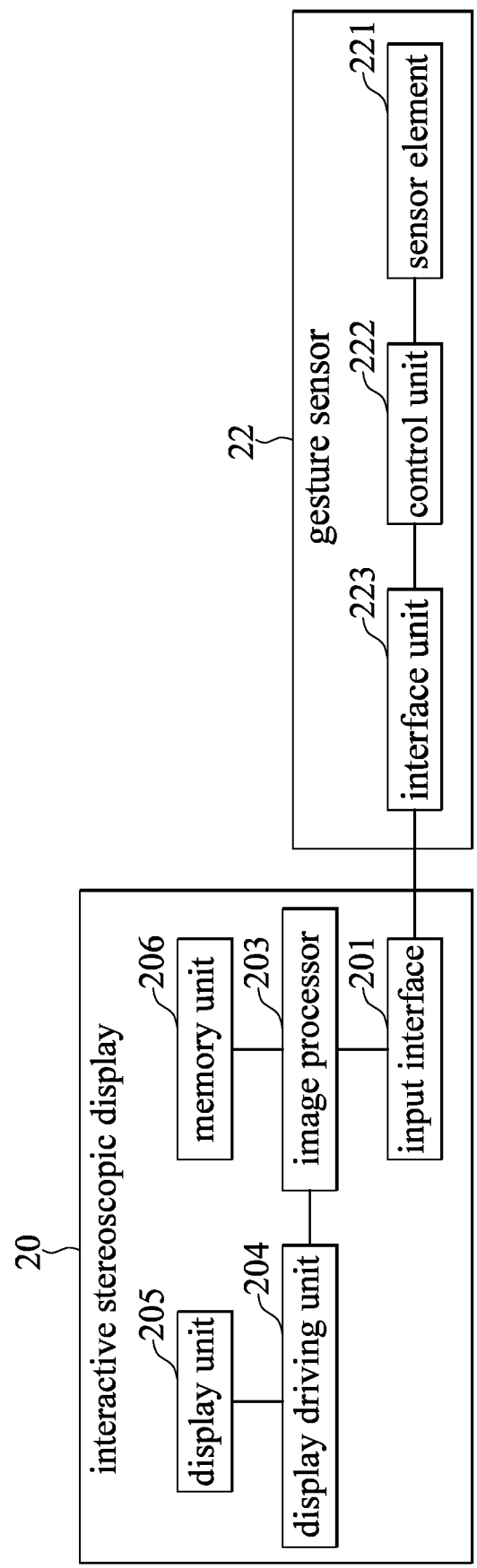
FIG. 2 shows a circuit diagram of an interactive stereoscopic display in one embodiment of the disclosure.

Reference is made to FIG. 2 that shows a circuit diagram of an interactive stereoscopic display according to one embodiment of the disclosure.

A stereoscopic image display 20 is provided in the diagram. The stereoscopic image display 20 connects with a gesture sensor 22. In one embodiment of the disclosure, both the gesture sensor 22 and the stereoscopic image display 20 can be two modules that are integrated into one device, or alternatively the stereoscopic image display 20 and the gesture sensor 22 are two independent devices that are interconnected via a line for communicating with each other.

In the stereoscopic image display 20, an image processor 203 that performs image processing in the interactive sensing method is provided. The image processor 203 is electrically connected with other electronic components such as an input interface 201. The stereoscopic image display 20 receives the data from sensing the gesture from the gesture sensor 22 via the input interface 201. The input interface 201 is a communication interface. According to one embodiment, the data received via the input interface 201 is the stereo coordinate variations obtained by the gesture sensor 22. The image processor 203 determines the interactive instruction according to the stereo coordinate variations. The interactive instruction allows the image processor 203 to calculate image coordinate data with respect to a new stereoscopic image.

In the image processor 203, when receiving the stereo coordinate variations corresponding to the gesture sensed by the gesture sensor 22, the interactive instruction indicative of the moving, rotating and/or zooming actions can be calculated. The interactive instruction is provided for looking up the image database in a memory unit 206 so as to obtain the stereoscopic image data corresponding to the variations, or alternatively the stereoscopic image data can be calculated by the image processor 203 instantly according to the interactive instruction. The stereoscopic image can be a static stereoscopic image or a view formed by a series of stereoscopic images. The stereoscopic image data is used to describe color information and three-dimensional space information for the stereoscopic image display 20 to display the stereoscopic image. The image processor 203 is electrically connected with a display driving unit 204 that is used to process the stereoscopic image data for generating the stereoscopic image to be displayed by a display unit 205.

The stereoscopic image display 20 connects to an interface unit 223 of the gesture sensor 22 via a wired or wireless connection. The interface unit 223 is a communication interface used to transmit signals. The gesture sensor 22 includes a sensor element 221 that is used to sense the gesture by lights, sounds, or images. The gesture indicates changes of some key portions of a hand, including the changes of the positions of fingers, palm and/or knuckles.

A control unit 222 acts as a control circuit of the gesture sensor 22. The control unit 222 connects with the stereoscopic image display 20 via the interface unit 223. The control unit 222 produces the stereo coordinate variations with respect to the gesture sensed by the sensor element 221.

Further, the stereo coordinate variations corresponding to the gesture sensed by the gesture sensor 22 are based on the coordinates in the coordinate system with respect to the gesture sensor 22. A coordinate transformation may be required if the stereo coordinate variations are transferred to the stereoscopic image display 20. The coordinate transformation is performed to transform coordinate data in a sensor-based coordinate system according to the interactive instruction into a display-based coordinate system for displaying the stereoscopic image through image coordinate data.

The stereoscopic image display 20 displays the stereoscopic image according to the well-defined positions of the whole image. A correlation of the gesture between its original coordinate system and the coordinate system in the stereoscopic image display 20 can be determined after coordinate transformation. The correlation indicates a relationship between the three-dimensional coordinates with respect to the gesture and the stereoscopic image to be displayed. In an exemplary example, a moving gesture causes the stereoscopic image to move toward a specific direction, and a variation along this direction should be added to the three-dimensional coordinates of the stereoscopic image. Therefore, the stereoscopic image should be updated to a new position so as to generate a new stereoscopic image. In the image processor 203, a new stereoscopic image data can be obtained by querying the image database or being calculated instantly. The stereoscopic image data is provided to the display driving unit 204 for displaying the stereoscopic image. Further, a rotating gesture causes the stereoscopic image to rotate at an angle, so that this variation should be added to the three-dimensional coordinates of the stereoscopic image so as to form another new stereoscopic image data. Still further, a zooming gesture will change a size of the stereoscopic image at a same reference position. The three-dimensional coordinates relating to the stereoscopic image changes with the zooming gesture. After the image processor 203 queries an image database or performs an instant calculation, a new stereoscopic image data is generated for the display driving unit 204 to display.

The moving, rotating and zooming actions made by the gesture may be combined at will for forming an interactive instruction. The interactive instruction is provided for the image processor 203 to calculate a new stereoscopic image data. The stereoscopic image data is provided for the stereoscopic image display 20 to display a stereoscopic image.

Figure 3:
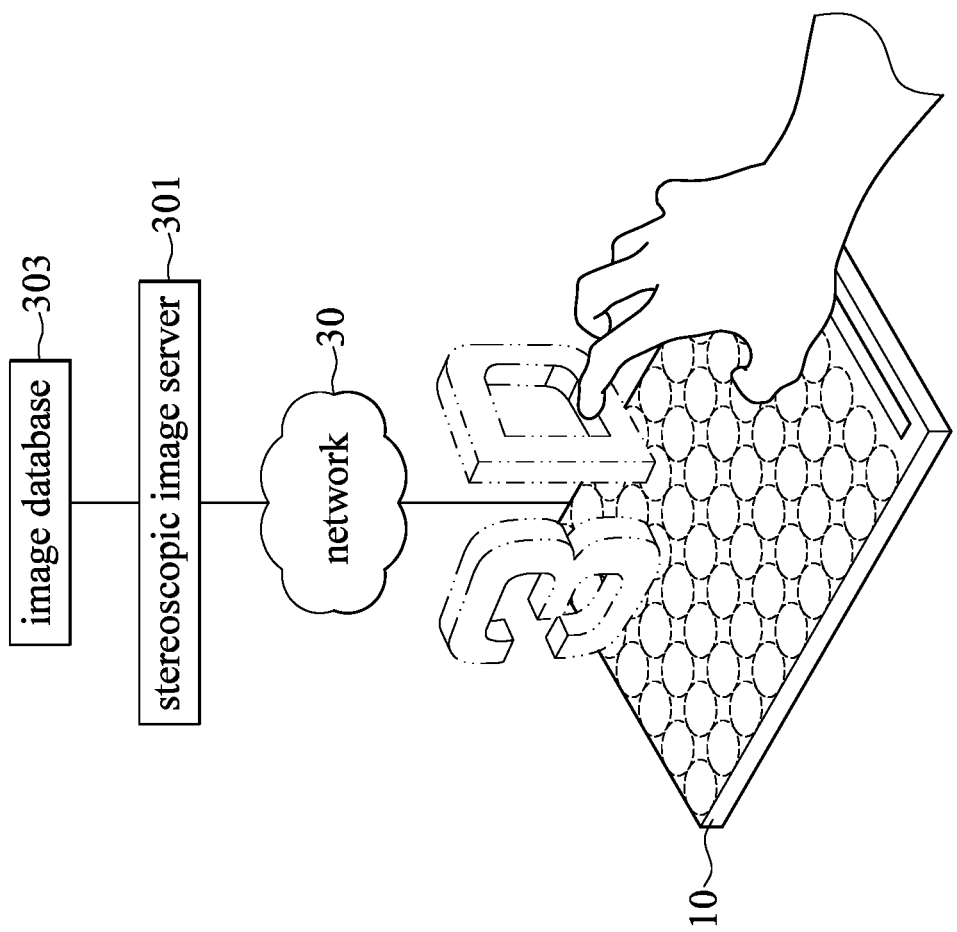
FIG. 3 is another schematic diagram depicting the interactive stereoscopic display according to one further embodiment of the disclosure.

Reference is made to FIG. 3 that shows the interactive stereoscopic display according to one further embodiment of the disclosure. The interactive stereoscopic display connects with a stereoscopic image server 301 via a network 30. The above-mentioned stereoscopic image data can be provided by the stereoscopic image server 301. The stereoscopic image server 301 provides an image database 303 for querying the stereoscopic image data according to an interactive instruction.

In an exemplary example, the data stored in a memory of the stereoscopic image display 20 can be checked if it includes the stereoscopic image data corresponding to a next posture due to the interactive instruction when a user performs an interaction. If the data stored in the stereoscopic image display 20 already includes the image data relating to the next state, the stereoscopic image display 20 can itself produce the stereoscopic image data and display the stereoscopic image. Otherwise, if the stereoscopic image display 20 does not include the image data relating to the next state, a request for acquiring new stereoscopic image data/file is generated and transmitted to the stereoscopic image server 301 via the network 30. The new stereoscopic image data can be downloaded and displayed as a new stereoscopic image in response to the interaction.

Referring to FIG. 1, when an interaction is performed upon the stereoscopic image displayed on the stereoscopic image display 10 by a hand 12 of the user, the gesture forms stereo coordinate variations that are referred to, to obtain the interactive instruction. The interactive instruction is transmitted to the stereoscopic image server 301 via the network 30, and the stereoscopic image server 301 provides new stereoscopic image data according to the interactive instruction.

Figure 4:
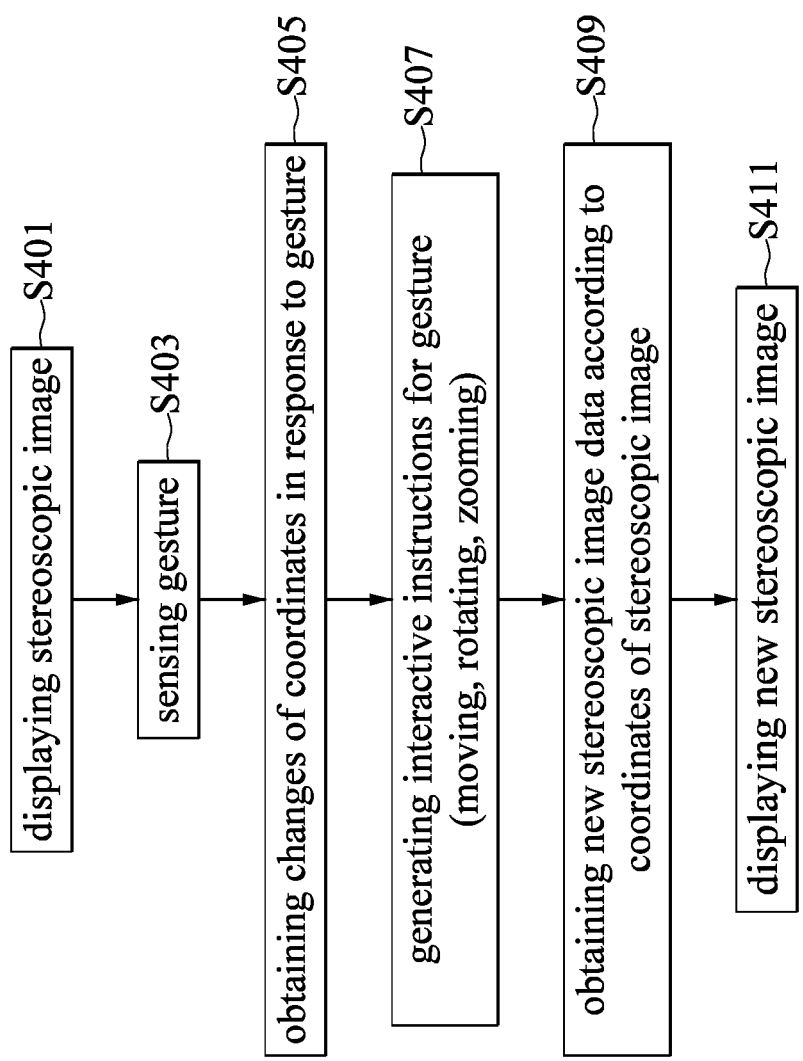
FIG. 4 shows a flow chart that describes an interactive sensing method performed in an interactive stereoscopic display according to one embodiment of the disclosure.

Next, reference is made to FIG. 4 that shows a flow chart for describing the interactive sensing method performed by the interactive stereoscopic display according to one embodiment of the disclosure.

In step S401, a stereoscopic image display displays a stereoscopic image. A user may perform a gesture upon the stereoscopic image display. In step S403, the gesture sensor of the stereoscopic image display senses a gesture. In step S405, the process running in the stereoscopic image display obtains the changes of coordinates with respect to the gesture. In step S407, an image processor of the stereoscopic image display determines an interactive instruction according to stereo coordinate variations formed by the gesture from a specific portion with moving, rotating and/or zooming actions.

Next, in step S409, the data of new three-dimensional coordinates corresponding to the interactive instruction can be obtained as compared to the image coordinate data of the original stereoscopic image or a previous state of image coordinate data. In step S411, a new stereoscopic image can be displayed.

Figure 5:
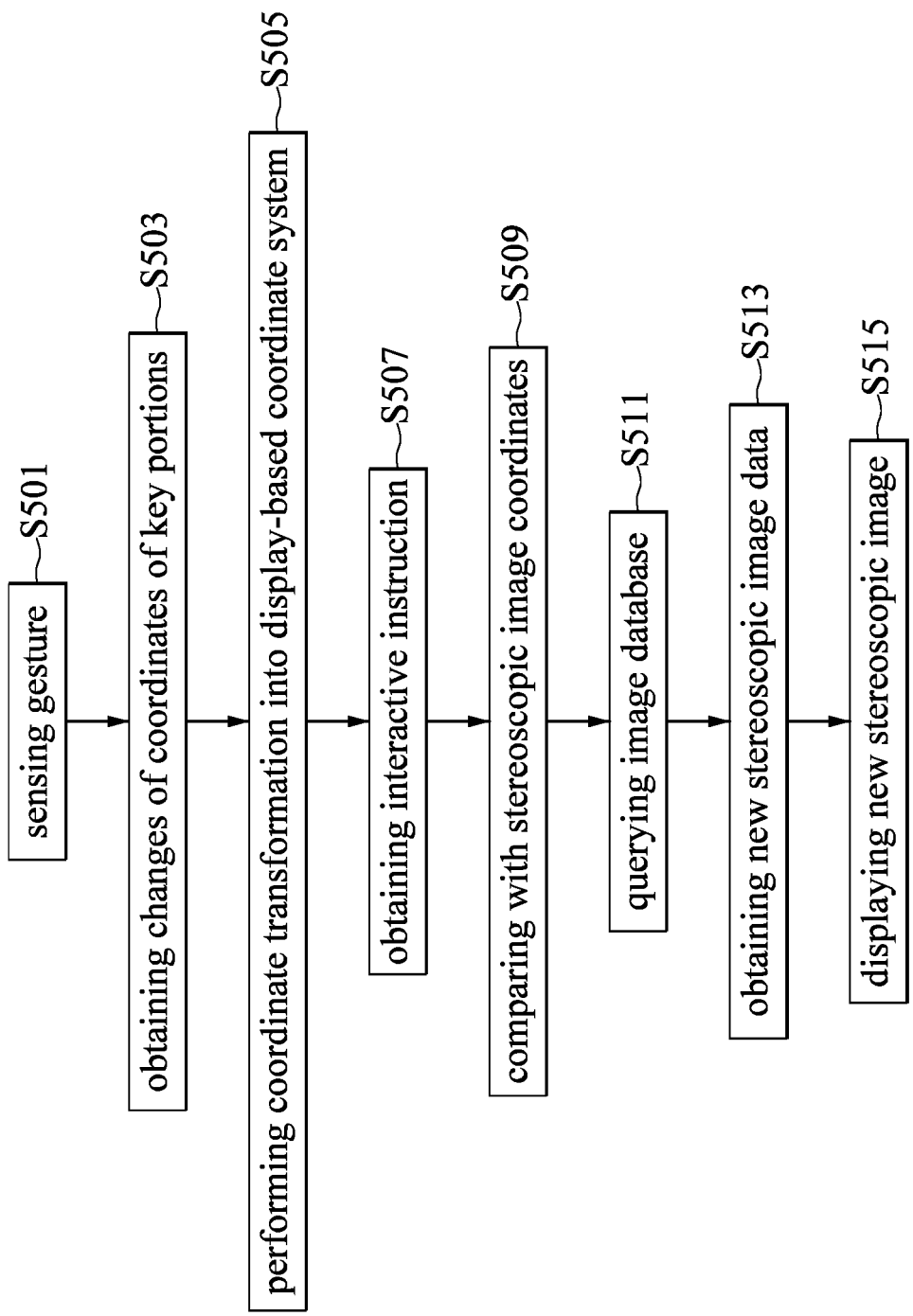
FIG. 5 shows another further flow chart that describes an interactive sensing method performed in the interactive stereoscopic display according to one further embodiment of the disclosure.

FIG. 5 shows another flow chart that describes the interactive sensing method in one embodiment of the disclosure.

Initially, such as in step S501, a gesture sensor is used to sense a gesture performed upon a stereoscopic image displayed on a stereoscopic image display. In step S503, variations of three-dimensional coordinates with respect to one or any combination of key portions such as fingers, palm and/or knuckles can be obtained. In step S505, the variations of three-dimensional coordinates are formed by the gestures sensed by the gesture sensor within a period of time. If it is necessary, the coordinate data in a gesture-based coordinate system with respect to the gesture sensor should be transformed to a display-based coordinate system with respect to the stereoscopic image display. Therefore, the gestures can be recognized by the image processor when the coordinate data of gesture is at the coordinate system that is the same with the coordinate system of the image processor. The image processor generates an interactive instruction formed by the gesture and recognizes a correlation between the interactive instruction and the stereoscopic image to be displayed.

In step S507, stereo coordinate variations with respect to one or more key portions can be determined from the gesture. The interactive instruction can accordingly be determined. As compared to the image coordinate data of the original stereoscopic image, a new image coordinate data of a new stereoscopic image is obtained (step S509). After querying the image database, the stereoscopic image data of the stereoscopic image with respect to the gesture can be obtained (step S511). The new stereoscopic image data is therefore provided (step S513) and used to display the new stereoscopic image (step S515).

In one further embodiment, in addition to obtaining the new stereoscopic image data by querying the image database, the stereoscopic image data can be calculated instantly when sensing changes of the stereoscopic image by performing various gestures.

Figure 6:
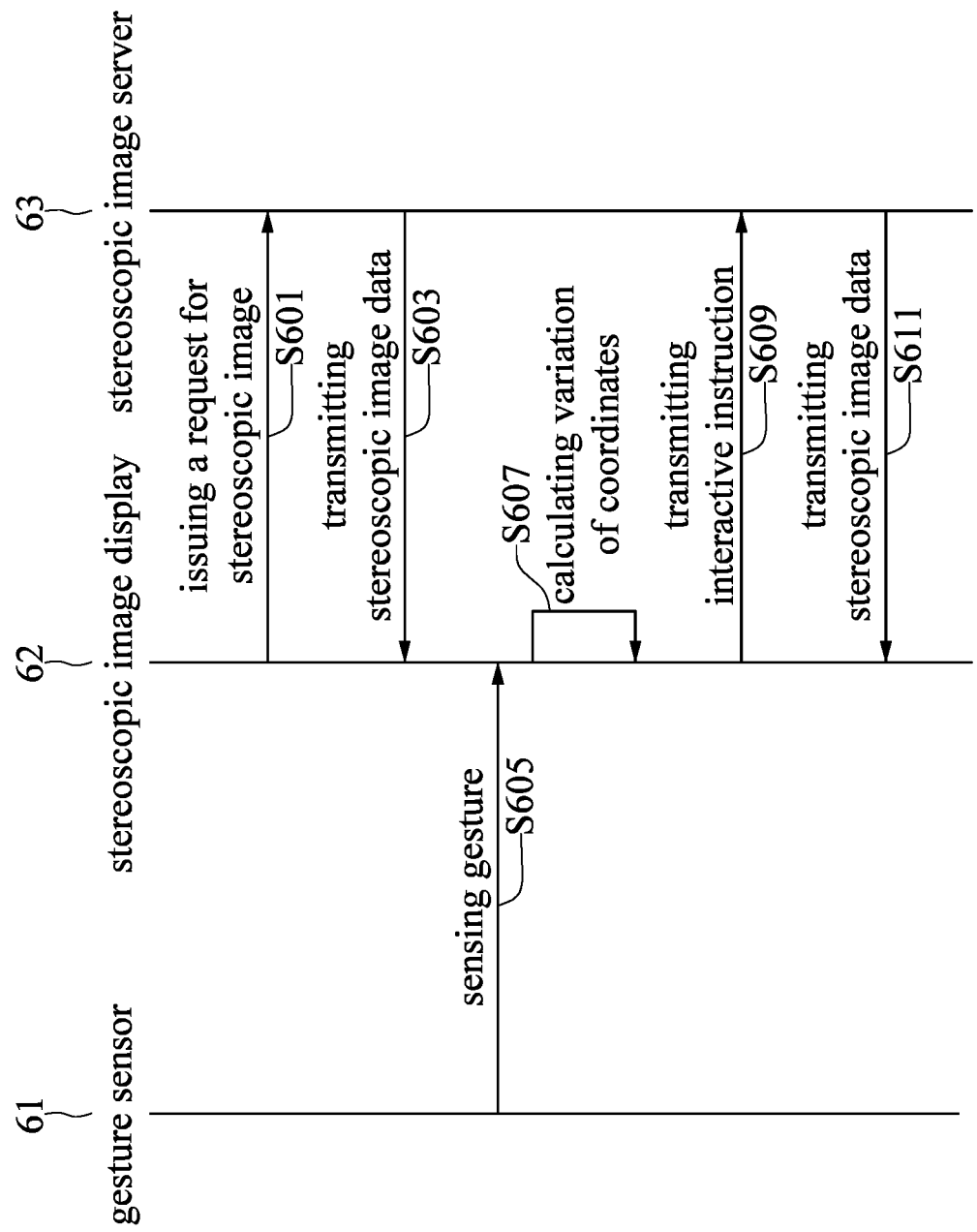
FIG. 6 shows yet another flow chart that describes an interactive sensing method performed in the interactive stereoscopic display in one embodiment of the disclosure.

FIG. 6 shows a flow chart that describes an interactive sensing method performed among a gesture sensor 61, a stereoscopic image display 62 and a stereoscopic image server 63 according to one embodiment of the disclosure.

Initially, such as in step S601, in response to a user's manipulation, the stereoscopic image display 62 requests a stereoscopic image to the stereoscopic image server 63. In step S603, the stereoscopic image server 63 transmits the stereoscopic image data to the stereoscopic image display 62 for displaying the stereoscopic image.

Next, in step S605, a user manipulates a stereoscopic image displayed on the stereoscopic image display 62 by gestures. In step S607, an image processor of the stereoscopic image display 62 processes the interactive instructions for acquiring the variations compared to the original stereoscopic image in the three-dimensional coordinates. The variations form the interactive instructions. In step S609, the interactive instructions indicative of a series of changes are transmitted to the stereoscopic image server 63. A processing procedure performed in the stereoscopic image server 63 calculates image coordinate data of new stereoscopic images according to the interactive instructions as compared with the original image coordinate data, or a previous state of image coordinate data. The new stereoscopic image data can also be obtained by querying the image database. In step S611, the new stereoscopic image data is transmitted to the stereoscopic image display 62 for displaying the new stereoscopic images.

To sum up the above description, in the interactive sensing method applied to the interactive stereoscopic display, the gesture of moving, rotating or zooming can be sensed by the stereoscopic image display. The interactive instruction can be used to obtain three-dimensional coordinates and vectors within a display space of a stereoscopic image display or a stereoscopic image server. A new stereoscopic image data can be obtained once one or a series of gestures is performed. Further, a series of stereoscopic images with continuous changes can be displayed for achieving an interactive effect where the changing stereoscopic images are continuously displayed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An interactive sensing method for an interactive stereoscopic display, comprising:
    displaying, by a stereoscopic image display which has a flat display panel, a floating stereoscopic image that is projected to a space at a distance from the flat display panel through a lens array according to stereoscopic image data, wherein the flat display panel displays multiple unit images that construct the floating stereoscopic image through the lens array and each of the unit images displayed on the flat display panel is imaged through a corresponding lens;
using a gesture sensor for sensing a gesture, wherein the gesture is performed by a user's hand performing an interaction upon the projected floating stereoscopic image so as to form stereo coordinate variations, wherein, after continuously acquiring stereo coordinates of the gesture, the stereo coordinate variations are obtained;
determining an interactive instruction according to the stereo coordinate variations, wherein the interactive instruction indicative of moving, rotating and/or zooming actions is calculated by an image processor when receiving the stereo coordinate variations corresponding to the gesture;
according to the interactive instruction, comparing image coordinate data of the floating stereoscopic image with a previous state of image coordinate data so as to produce new stereoscopic image data which is obtained by querying an image database or being calculated instantly; and
using the new stereoscopic image data to display a new floating stereoscopic image.

2. The method according to claim 1, wherein, after obtaining the interactive instruction, a coordinate transformation is performed to transform coordinate data in a sensor-based coordinate system according to the interactive instruction into a display-based coordinate system.

3. The method according to claim 1, wherein the stereoscopic image data is used to describe color information and three-dimensional space information that are used to display the floating stereoscopic image by the stereoscopic image display.

4. The method according to claim 3, wherein the stereoscopic image data is provided by a stereoscopic image server for the stereoscopic image display to display the floating stereoscopic image; when the interactive instruction is determined according to the stereo coordinate variations, the interactive instruction is transmitted to the stereoscopic image server, and the stereoscopic image server provides the new stereoscopic image data according to the interactive instruction.

5. The method according to claim 4, wherein, after obtaining the interactive instruction, a coordinate transformation is performed to transform coordinate data in a sensor-based coordinate system according to the interactive instruction into a display-based coordinate system for the stereoscopic image display.

6. The method according to claim 1, wherein the gesture sensor determines the gesture by means of image detection, light interception, or acoustic wave reflection.

7. The method according to claim 6, wherein the gesture indicates variations of three-dimensional coordinates with respect to positions of fingers, palm and knuckles, and the interactive instruction indicates one or any combination of moving, rotating and zooming actions.

8. The method according to claim 7, wherein, after obtaining the interactive instruction, a coordinate transformation is performed to transform coordinate data in a sensor-based coordinate system according to the interactive instruction into a display-based coordinate system for the stereoscopic image display.

9. An interactive stereoscopic display, comprising:
a stereoscopic image display, which has a flat display panel, used to display a floating stereoscopic image that is projected to a space at a distance from the flat display panel through a lens array according to stereoscopic image data, wherein the flat display panel displays multiple unit images that construct the floating stereoscopic image through the lens array and each of the unit images displayed on the flat display panel is imaged through a corresponding lens; and
a gesture sensor, sensing a gesture which is performed by a user's hand for performing an interaction upon the projected floating stereoscopic image so as to form stereo coordinate variations in response to the gesture, wherein, after continuously acquiring stereo coordinates of the gesture, the stereo coordinate variations are obtained;
wherein, in the stereoscopic image display, the stereo coordinate variations are obtained, an interactive instruction is determined according to the stereo coordinate variations in order to generate new stereoscopic image data by comparing a previous state of image coordinate data with image coordinate data of the floating stereoscopic image, and display a new floating stereoscopic image using the new stereoscopic image data which is obtained by querying an image database or being calculated instantly according to the interactive instruction;
wherein the interactive instruction indicative of moving, rotating and/or zooming actions is calculated by an image processor when receiving the stereo coordinate variations corresponding to the gesture.

10. The interactive stereoscopic display according to claim 9, wherein, after obtaining the interactive instruction, a coordinate transformation is performed to transform coordinate data in a sensor-based coordinate system according to the interactive instruction into a display-based coordinate system for the stereoscopic image display.

11. The interactive stereoscopic display according to claim 9, wherein the interactive stereoscopic display links to a stereoscopic image server that provides the stereoscopic image data.

12. The interactive stereoscopic display according to claim 11, wherein the gesture sensor determines the gesture by means of image detection, light interception, or acoustic wave reflection.

13. The interactive stereoscopic display according to claim 12, wherein the gesture indicates variations of three-dimensional coordinates with respect to positions of fingers, palm and knuckles, and the interactive instruction indicates one or any combination of moving, rotating and zooming actions.

14. The interactive stereoscopic display according to claim 13, wherein, after obtaining the interactive instruction, a coordinate transformation is performed to transform coordinate data in a sensor-based coordinate system according to the interactive instruction into a display-based coordinate system for the stereoscopic image display.

* * * * *